US011167432B2

United States Patent
Mizukoshi et al.

(10) Patent No.: US 11,167,432 B2
(45) Date of Patent: Nov. 9, 2021

(54) ROBOT

(71) Applicant: FANUC CORPORATION, Yamanashi (JP)

(72) Inventors: Tomoaki Mizukoshi, Yamanashi (JP); Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/860,448

(22) Filed: Apr. 28, 2020

(65) Prior Publication Data

US 2020/0376688 A1 Dec. 3, 2020

(30) Foreign Application Priority Data

May 30, 2019 (JP) .............................. JP2019-101389

(51) Int. Cl.
*B25J 19/00* (2006.01)
*H01R 31/00* (2006.01)

(52) U.S. Cl.
CPC ........ *B25J 19/0029* (2013.01); *H01R 31/005* (2013.01)

(58) Field of Classification Search
CPC .................................................. B25J 19/0033
See application file for complete search history.

(56) References Cited

U.S. PATENT DOCUMENTS

| | | | | |
|---|---|---|---|---|
| 3,712,481 A * | 1/1973 | Harwood | ................... | B25J 9/06 |
| | | | | 414/736 |
| 4,880,265 A * | 11/1989 | Drexel | ..................... | B25J 15/04 |
| | | | | 294/86.4 |
| 5,042,774 A * | 8/1991 | Kakinuma | ................. | B25J 9/08 |
| | | | | 248/664 |
| 5,065,062 A * | 11/1991 | Uehara | ................ | B25J 19/0079 |
| | | | | 310/114 |
| 5,212,432 A * | 5/1993 | Ohtani | ..................... | B25J 9/046 |
| | | | | 310/56 |
| 5,241,875 A * | 9/1993 | Kochanneck | .............. | B25J 9/08 |
| | | | | 180/8.6 |
| 5,564,312 A * | 10/1996 | Brunman | ............. | B25J 19/0029 |
| | | | | 414/918 |
| 2003/0200831 A1* | 10/2003 | Matsumoto | ............ | H02G 11/00 |
| | | | | 74/490.06 |
| 2004/0200304 A1 | 10/2004 | Matsumoto et al. | | |
| 2006/0101936 A1 | 5/2006 | Inoue et al. | | |
| 2007/0142970 A1* | 6/2007 | Burbank | ................ | A61B 34/30 |
| | | | | 700/251 |
| 2008/0260510 A1* | 10/2008 | Iwai | ..................... | B25J 19/0029 |
| | | | | 414/787 |

(Continued)

FOREIGN PATENT DOCUMENTS

| EP | 1464456 A1 | 10/2004 |
|---|---|---|
| EP | 1625920 A1 | 2/2006 |

(Continued)

*Primary Examiner* — Howard J Sanders
*Assistant Examiner* — Gregory T Prather
(74) *Attorney, Agent, or Firm* — Maier & Maier, PLLC

(57) ABSTRACT

A robot including a robot main body having at least two openings passing through an outer wall thereof in a wall thickness direction and a cable routed in an interior of the robot main body, where the cable includes branch cables each of which is split off from a trunk cable of the cable in a vicinity of each of the openings.

8 Claims, 10 Drawing Sheets

(56) References Cited

U.S. PATENT DOCUMENTS

| | | | |
|---|---|---|---|
| 2011/0111622 A1* | 5/2011 | Koyama | H02G 11/00 439/577 |
| 2012/0215356 A1* | 8/2012 | Igarashi | B25J 9/1628 700/258 |
| 2013/0238129 A1* | 9/2013 | Rose | B25J 9/1612 700/258 |
| 2014/0099817 A1* | 4/2014 | Perlman | H01R 13/64 439/357 |
| 2014/0137689 A1* | 5/2014 | Nogami | B25J 9/0087 74/490.05 |
| 2014/0290415 A1* | 10/2014 | Hasuo | B25J 19/0025 74/490.02 |
| 2014/0379129 A1* | 12/2014 | Edsinger | B25J 9/0096 700/254 |
| 2015/0114162 A1* | 4/2015 | Kirihara | H01R 12/613 74/490.02 |
| 2015/0321344 A1* | 11/2015 | Hahakura | B25J 19/023 74/490.02 |
| 2017/0143438 A1* | 5/2017 | Komuro | A61B 34/37 |
| 2017/0182669 A1* | 6/2017 | Bordegnoni | B25J 19/0029 |
| 2017/0259436 A1* | 9/2017 | Nakayama | B25J 19/0045 |
| 2017/0282382 A1* | 10/2017 | Inoue | B25J 19/0029 |
| 2017/0291313 A1* | 10/2017 | Inoue | B25J 17/00 |
| 2018/0316139 A1* | 11/2018 | Berrocal | H01R 13/426 |
| 2018/0333867 A1* | 11/2018 | Lee | B25J 19/0029 |
| 2019/0118285 A1* | 4/2019 | Ma | B23K 9/173 |
| 2020/0086508 A1* | 3/2020 | Ishizu | B25J 18/04 |
| 2020/0108497 A1* | 4/2020 | Miyazaki | B25J 9/08 |
| 2020/0156239 A1* | 5/2020 | Fujioka | B25J 19/0029 |

FOREIGN PATENT DOCUMENTS

| | | |
|---|---|---|
| JP | 2004-299002 A | 10/2004 |
| JP | 2006-051581 A | 2/2006 |
| JP | 2014-198351 A | 10/2014 |

* cited by examiner

ROBOT

CROSS-REFERENCE TO RELATED APPLICATIONS

This application is based on Japanese Patent Application No. 2019-101389, the content of which is incorporated herein by reference.

FIELD

This disclosure relates to a robot.

BACKGROUND

There are well-known robots each including a line distribution board having a plurality of detachable line distribution board elements (refer to, for example, Japanese Unexamined Patent Application, Publication No. 2014-198351). Each of the line distribution board elements can be independently detached from the robot main body. Connectors, which are attached to the respective tips of a plurality of linear objects, are connected to the respective line distribution board elements. When a linear object needs to be replaced, the linear object can be easily replaced because the line distribution board element to which the connector of the linear object to be replaced is attached can be independently detached from the robot main body.

SUMMARY

One aspect of the present disclosure is directed to a robot including: a robot main body having at least two openings passing through an outer wall thereof in a wall thickness direction; and a cable routed in an interior of the robot main body, wherein the cable includes branch cables each of which is split off from a trunk cable of the cable in a vicinity of each of the openings.

DETAILED DESCRIPTION

A robot 1 according to one embodiment of the present disclosure will now be described with reference to the drawings.

Figure 1:
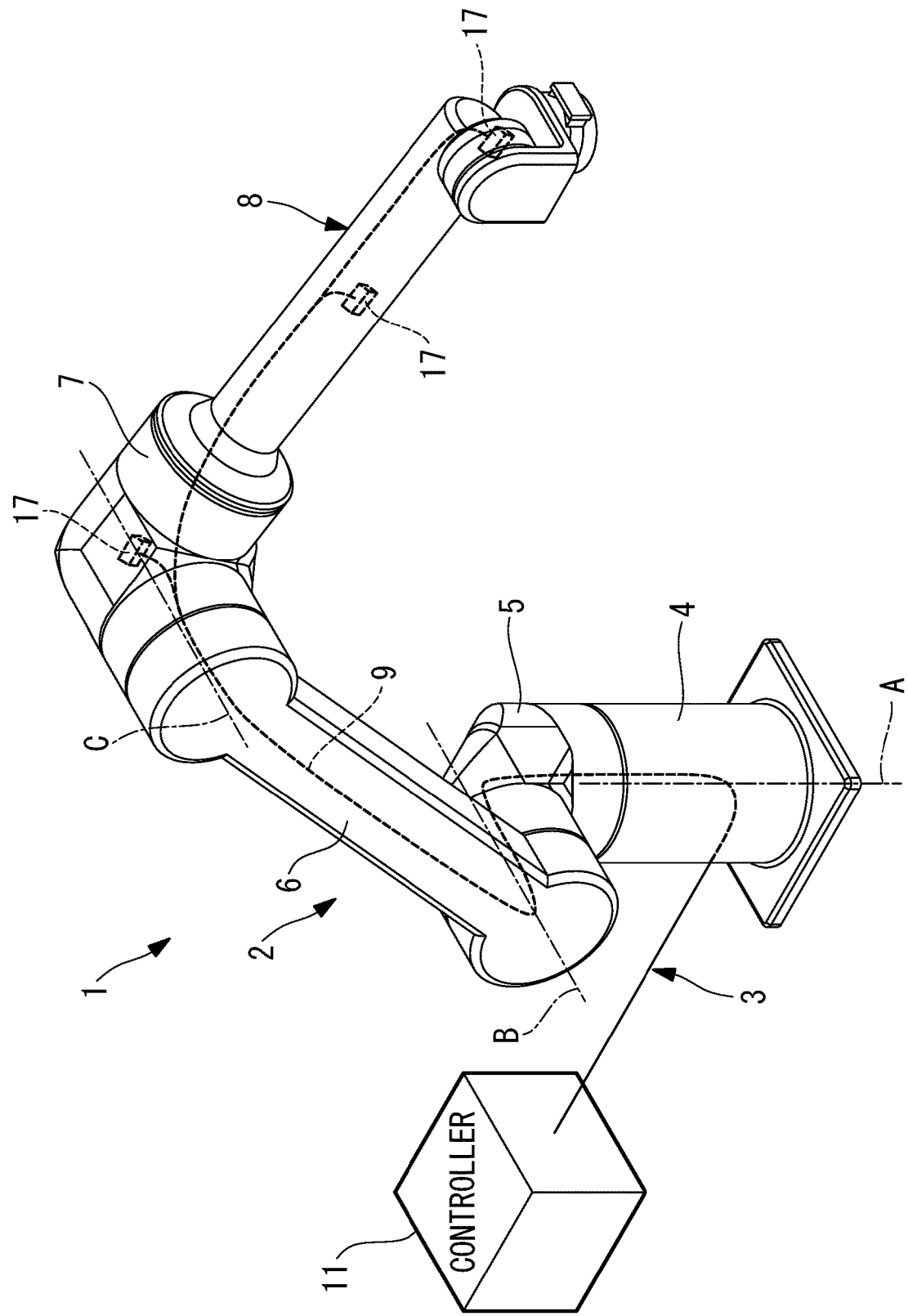
FIG. 1 is a perspective view showing a robot according to one embodiment of the present disclosure.

As shown in, for example, FIG. 1, the robot 1 according to this embodiment is a 6-axis articulated robot and includes a robot main body 2 and a cable 3 that is routed in the interior of the robot main body 2.

The robot main body 2 includes: a base 4 installed on the floor surface; and a swiveling body 5 that is supported so as to be rotatable relative to the base 4 about a vertical first axis A. In addition, the robot main body 2 includes: a first arm 6 that is supported so as to be rotatable relative to the swiveling body 5 about a horizontal second axis B; and a second arm 7 that is supported so as to be rotatable relative to the first arm 6 about a third axis C, which is parallel to the second axis B. Furthermore, the robot main body 2 includes a 3-axis wrist unit 8 supported on the tip of the second arm 7.

Motors (not shown in the figure) for driving the swiveling body 5, the first arm 6, the second arm 7, and the wrist unit 8 are arranged in the interior of the robot main body 2.

Figure 2:
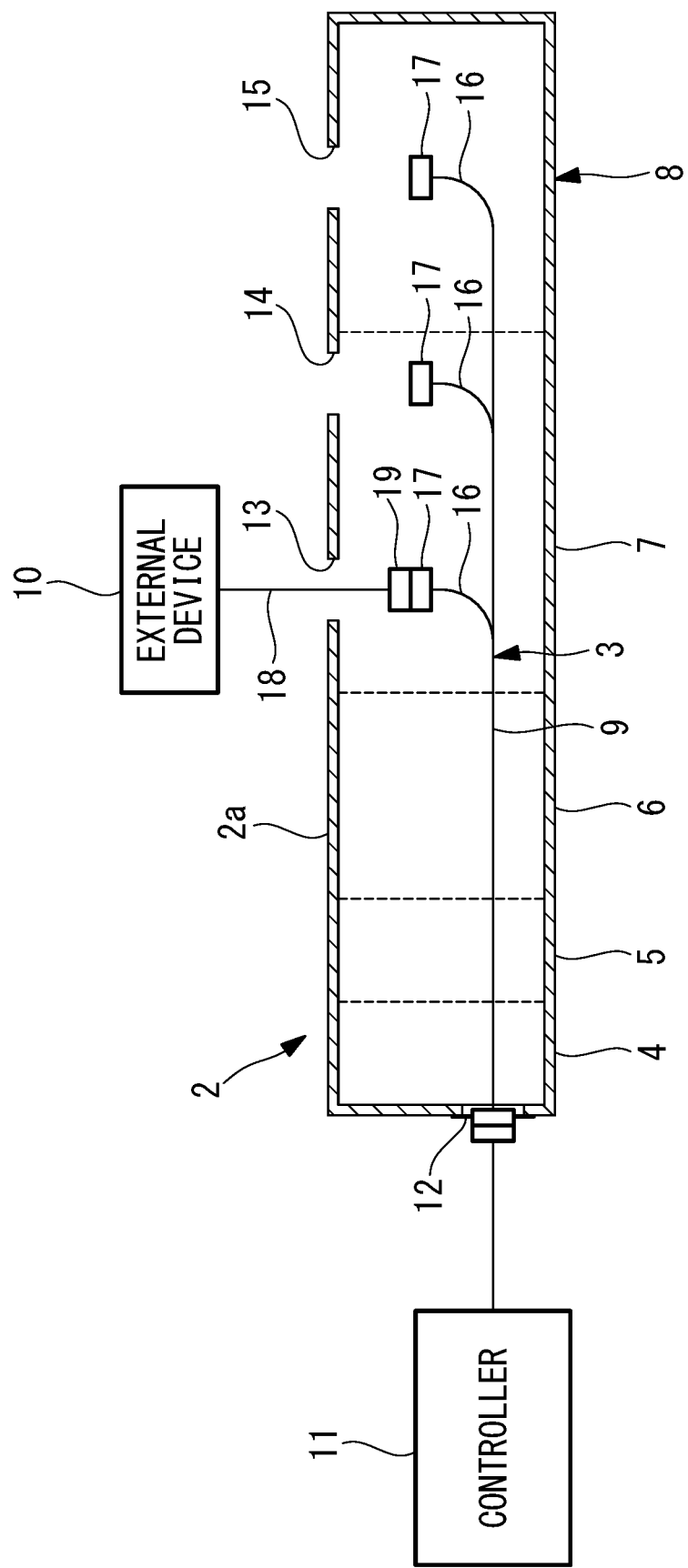
FIG. 2 is a schematic diagram showing openings, branch cables, and an external device that are provided in a robot main body of the robot in FIG. 1.

The cable 3 is formed by bundling a motor-driving cable (not shown in the figure) for transmitting electrical power and signals for driving each of the motors, as well as an end-effector cable (trunk cable) 9 composed of a cable for transmitting electrical power and signals to an external device 10 (e.g., chuck-type hand, camera, spot-welding gun, arc-welding torch, wire-feeding machine, sealing gun, force sensor) and a tube for supplying air to the external device 10, which is fixed at any location on the external surface of the robot main body 2. As shown in FIG. 2, the cable 3 is guided from a controller 11 installed outside the robot main body 2 to the interior of the robot main body 2 via a line distribution board 12 provided on the base 4.

In addition, the robot main body 2 includes openings 13, 14, and 15 at a plurality of different locations thereof, said openings passing through an outer wall 2a in the wall thickness direction. In the example shown in FIGS. 1 to 5, the openings 13, 14, and 15, of the same shape, are provided at the basal end side of the second arm 7, a lengthwise intermediate position of the second arm 7, and the wrist unit 8, respectively. Note that, in the vicinity of each of the openings 13, 14, and 15, a device mounting surface (not shown in the figure) for attaching the external device 10 is provided on the external surface of the robot main body 2.

In addition, as shown in FIG. 2, the cable 3 includes a branch cable 16 that is split off from the end-effector cable 9 in the vicinity of each of the openings 13, 14, and 15 of the robot main body 2. An internal connector 17 is attached to the tip of each of the branch cables 16. The internal connectors 17 include connection interfaces with the same external device 10, and all the internal connectors 17 have the same specifications and can be connected to a cable 18 of the external device 10 fixed to the robot main body 2. Note that not all the internal connectors 17 need to be completely the same, and the internal connectors 17 may have different specifications. The internal connectors 17 may be, for example, rod-like relay terminals.

According to the robot 1 of this embodiment with the above-described structure, when a user is to attach the external device 10 to the robot 1, the user attaches the external device 10 by selecting the device mounting surface provided in the vicinity of one of the openings 13, 14, and 15. Also, the user can connect the cable 18 of the external device 10 to the internal connector 17 of the internal branch cable 16 via the opening 13, 14, or 15 closest to the attached external device 10.

When the user is to attach the external device 10 to, for example, the basal end of the second arm 7 as shown in FIG. 2, the user can connect a connector 19 attached to the cable 18 of the external device 10 to the internal connector 17 near the opening 13 provided at the basal end of the second arm 7.

By doing so, even if the external device 10 is attached at various different locations according to the type of the external device 10 or as required by the user, the user can easily perform the supply of power, etc. to the external device 10 by using the branch cable 16 provided in the closest opening 13, 14, or 15. In other words, the external wiring for the external device 10 can be shortened by minimizing the distance from the internal connector 17 of the branch cable 16 to the external device 10, thereby easily preventing the external wiring from coming into contact with a peripheral object when the robot main body 2 moves. In addition, because the cable 18 from the opening 13 to the external device 10 does not need to be movable wiring, the work of wire routing can be made easier.

Figure 3:
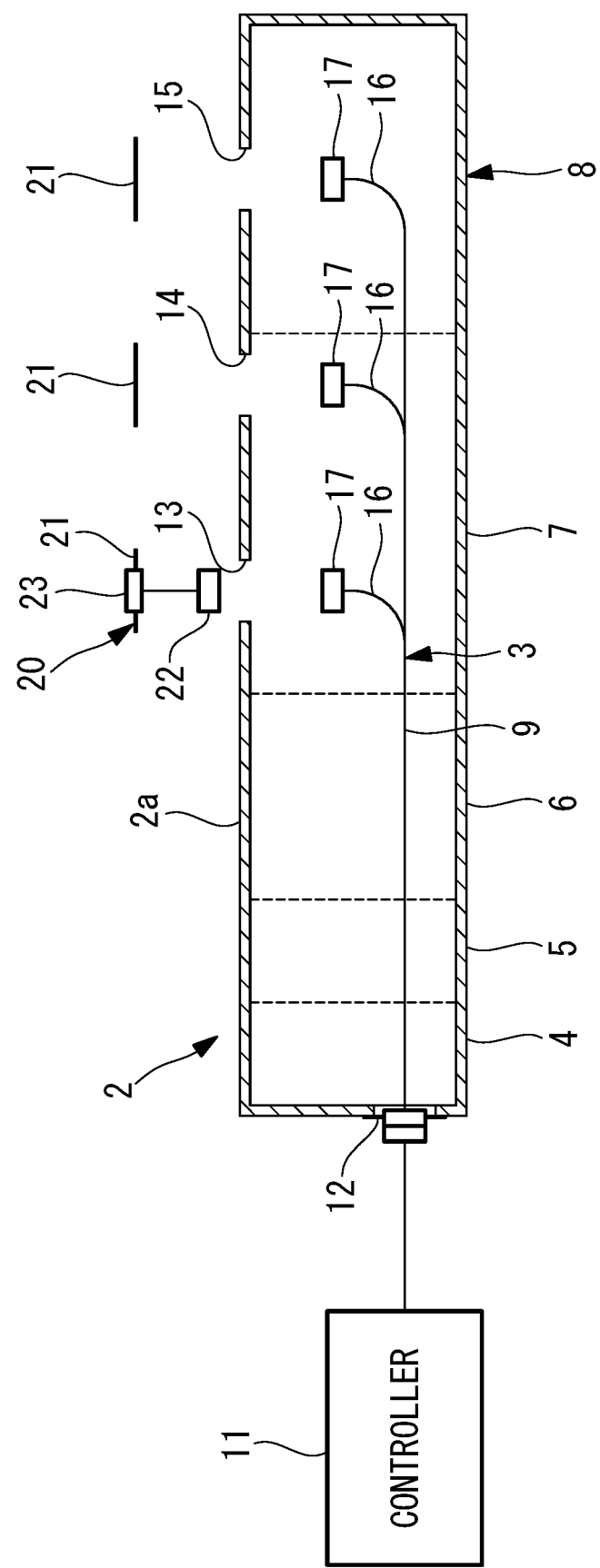
FIG. 3 is a schematic diagram, as FIG. 2, showing a case where the openings provided in the robot main body of the robot in FIG. 1 are closed by plates.

Note that in this embodiment, the opening 13, 14, or 15 corresponding to the branch cable 16 to be used may be closed with a line distribution board (lid member) 20, as shown in FIGS. 3 to 6. As shown in FIG. 3, the line distribution board 20 is formed by fixing an external-device connecting connector 23, to which the cable 18 of the external device 10 can be connected, to a plate (lid member) 21, which can close the openings 13, 14, and 15, such that the external-device connecting connector 23 passes through the plate 21 in the plate thickness direction. A relay connector 22, which can be connected to the internal connector 17, is connected to the external-device connecting connector 23. In this case, the internal connectors 17 include connection interfaces with the same relay connector 22.

Figure 4:
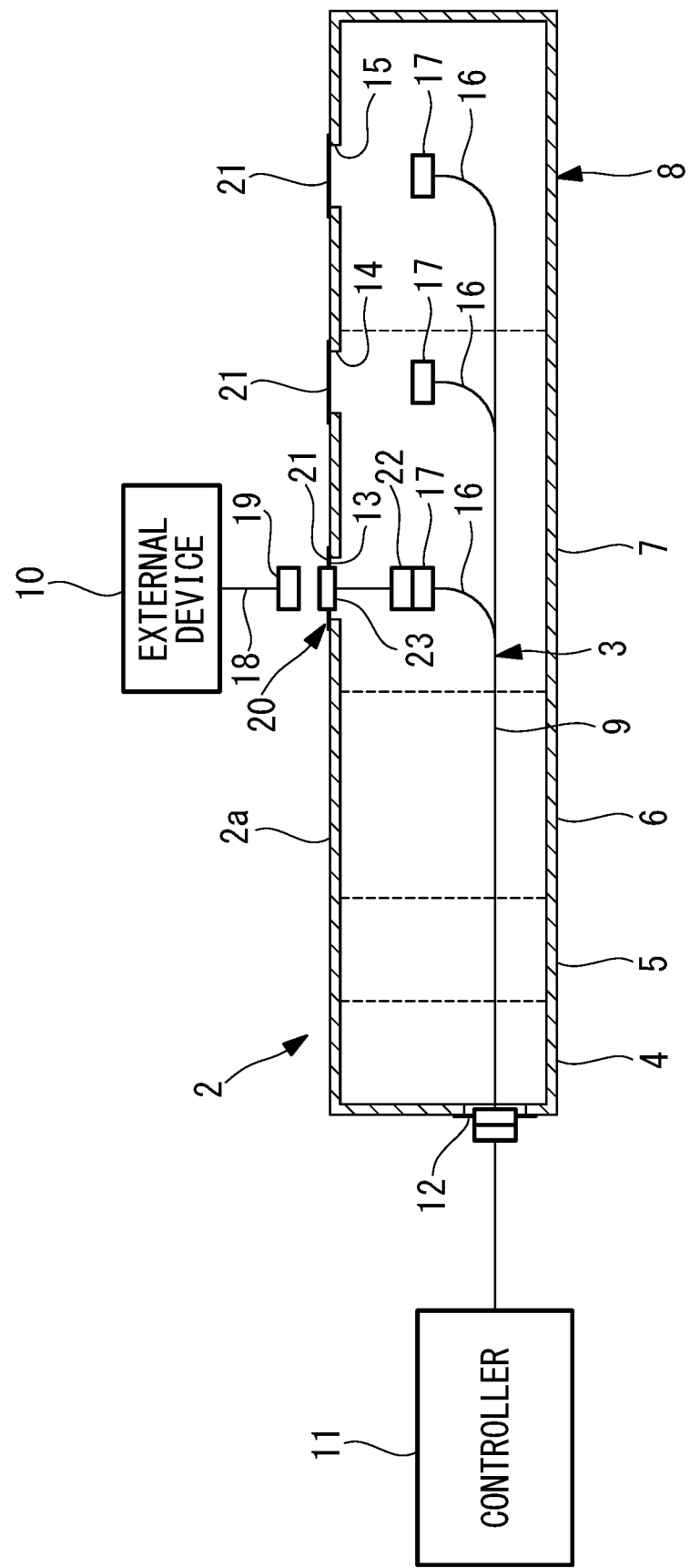
FIG. 4 is a schematic diagram showing a state in which the openings in FIG. 3 are closed by plates, and an external device is attached to a line distribution board mounted in the opening at the basal end of a second arm.

As shown in, for example, FIGS. 3 and 4, when the external device 10 is to be attached to the basal end of the second arm 7, the relay connector 22 is connected to the internal connector 17 near the opening 13 provided at the basal end of the second arm 7, and the connector 19 of the external device 10 is connected to the external-device connecting connector 23, which is connected to this relay connector 22.

Figure 5:
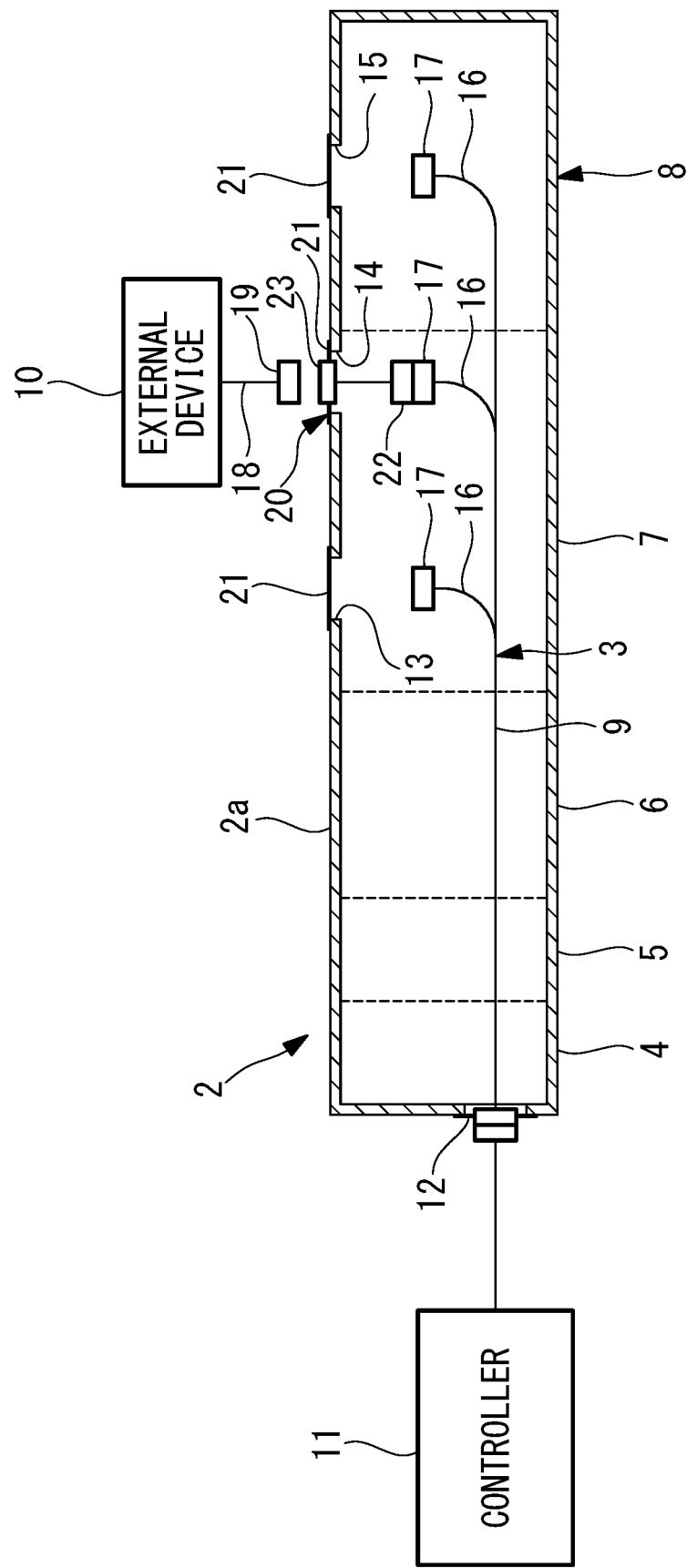
FIG. 5 is a schematic diagram showing a state in which the openings in FIG. 3 are closed by plates, and an external device is attached to a line distribution board mounted in the opening at an intermediate position of the second arm.

In addition, as shown in, for example, FIG. 5, when the external device 10 is to be attached to an intermediate position of the second arm 7, the relay connector 22 is connected to the internal connector 17 near the opening 14 provided at an intermediate position of the second arm 7.

Figure 6:
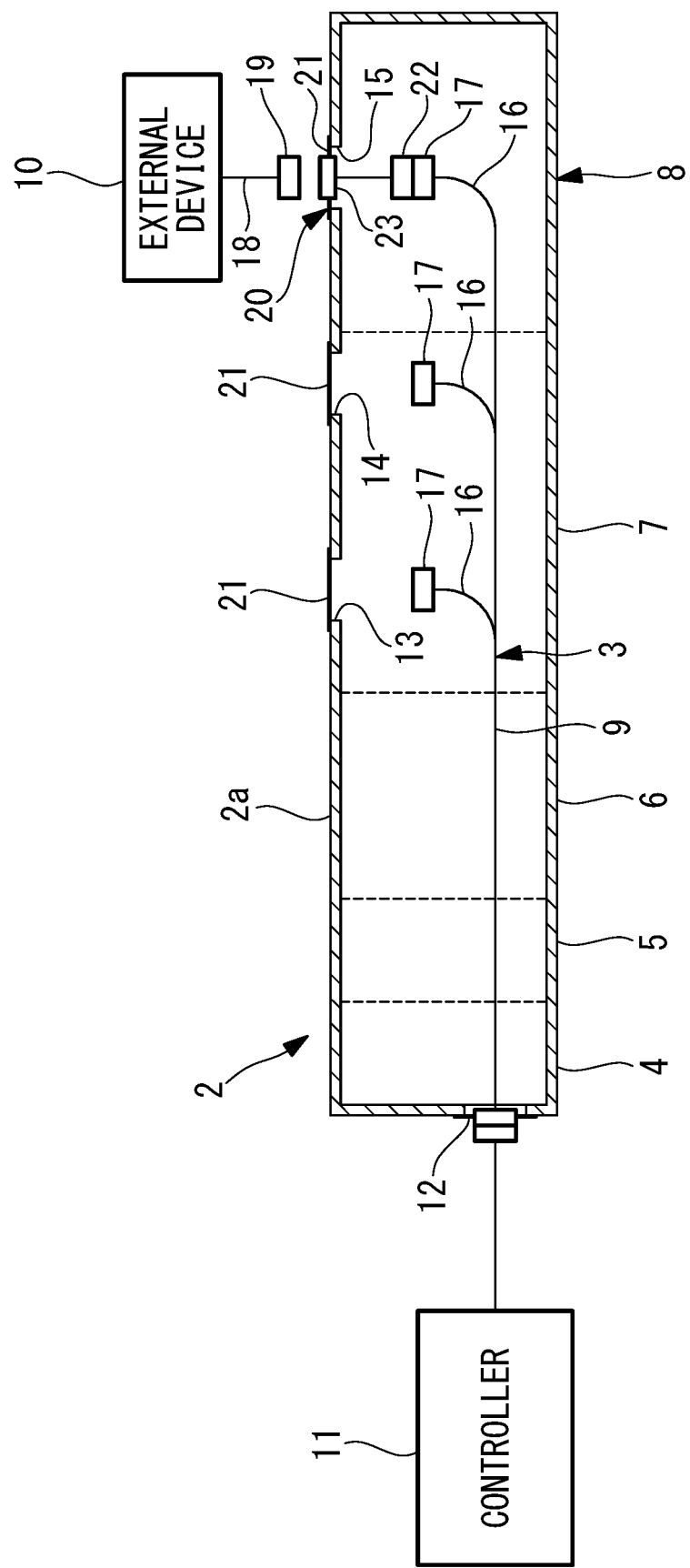
FIG. 6 is a schematic diagram showing a state in which the openings in FIG. 3 are closed by plates, and an external device is attached to a line distribution board mounted in the opening formed in a wrist unit.

In addition, as shown in, for example, FIG. 6, when the external device 10 is to be attached to the wrist unit 8, the relay connector 22 is connected to the internal connector 17 near the opening 15 provided at the wrist unit 8.

Thus, by connecting the internal connector 17 and the relay connector 22 and then retaining, with a screw or the like, the plate 21 at the location for covering the opening 13, 14, or 15, the line distribution board 20 can be fixed to the robot main body 2 with the connection surface of the external-device connecting connector 23 exposed outside. In this case, the external device 10 and the internal connector 17 can be easily connected merely by connecting the connector 19 provided on the cable 18 of the external device 10 to the external-device connecting connector 23 on the line distribution board 20.

In addition, because the openings 13, 14, and 15 are closed by the respective plates 21, it is possible to prevent dust, splashes, etc. from entering the interior of the robot main body 2.

In addition, a gasket may be inserted between each of the openings 13, 14, and 15 and the plate 21. By doing so, the dust-proof performance can be enhanced.

In addition, any of the openings 13, 14, and 15 to which no line distribution board 20 is attached can be closed with the plate (lid member) 21 alone.

In addition, if all openings 13, 14, and 15 are made to have the same shape and all plates 21 are made to have the same shape, it is sufficient to prepare a single line distribution board 20 only, thereby making it possible to select the opening 13, 14, or 15 to which the line distribution board 20 is attached, connect the internal connector 17 and the relay connector 22, and close, with the plates 21, any unused openings of the openings 13, 14, and 15.

In addition, the line distribution board 20 may include two or more external-device connecting connectors 23.

Figure 7:
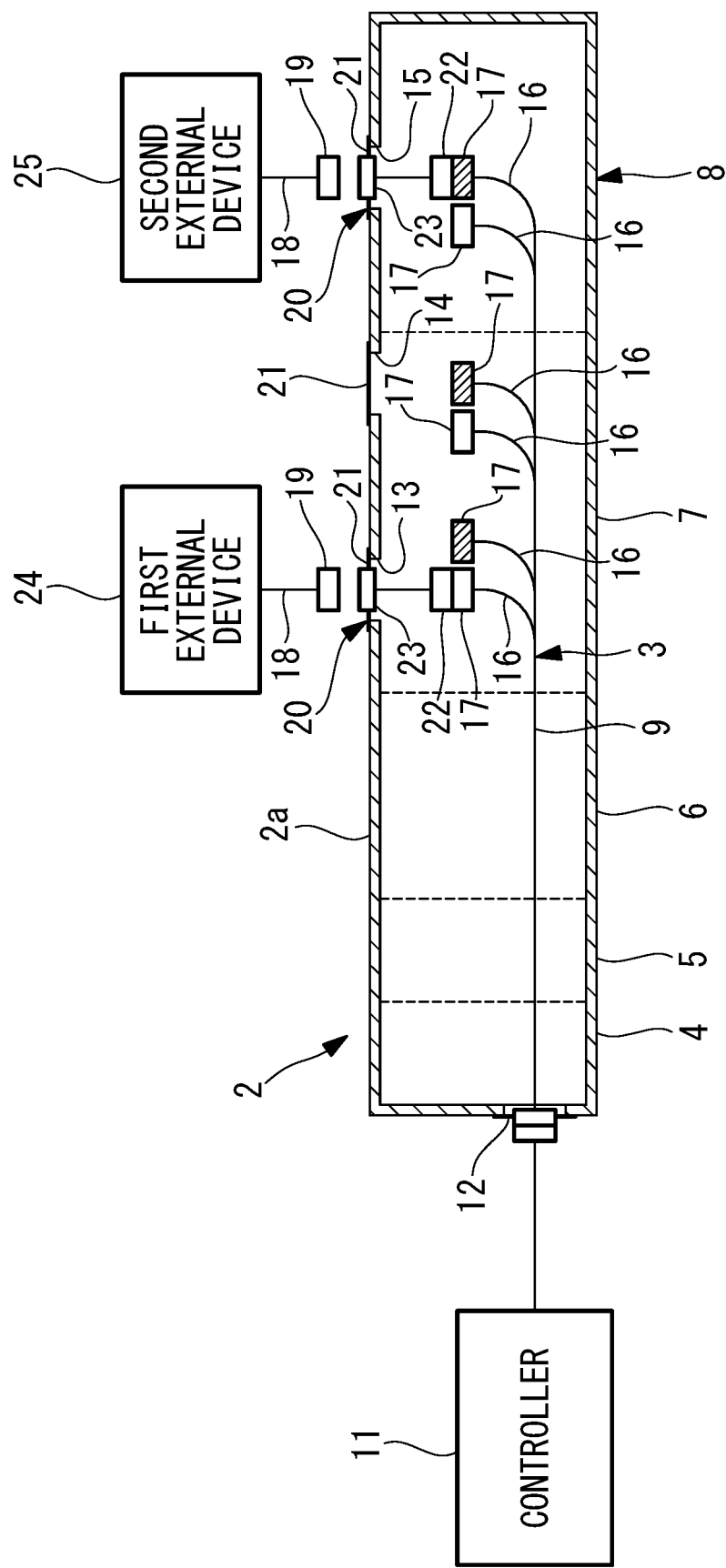
FIG. 7 is a schematic diagram showing a modification of the embodiment in FIG. 2, illustrating a case where at least two branch cables are provided in the vicinity of each of the openings.

In addition, as shown in FIG. 7, two or more branch cables 16 that are split off from the end-effector cable 9 may be provided in the vicinity of each of the openings 13, 14, and 15.

In this case, at least two types of line distribution board 20 corresponding to the internal connectors 17 attached to the respective branch cables 16 may be provided, and the line distribution boards 20 may be provided in at least two of the openings 13, 14, and 15. More specifically, the line distribution board 20 to which a first external device (external device) 24 is connected is attached to one opening 13 such that the relay connector 22 and the external-device connecting connector 23 correspond to the internal connector 17 of one branch cable 16. In addition, the line distribution board 20 to which a second external device (external device) 25 is connected can be attached to another opening 15 such that the relay connector 22 and the external-device connecting connector 23 correspond to the internal connector 17 of another branch cable 16. In FIGS. 2 to 7, it is preferable that unused internal connectors 17 be fixed to certain components in the second arm 7 and the wrist unit 8 so as not to be swung and moved in the second arm 7 and the wrist unit 8 as a result of the robot main body 2 moving.

Figure 8:
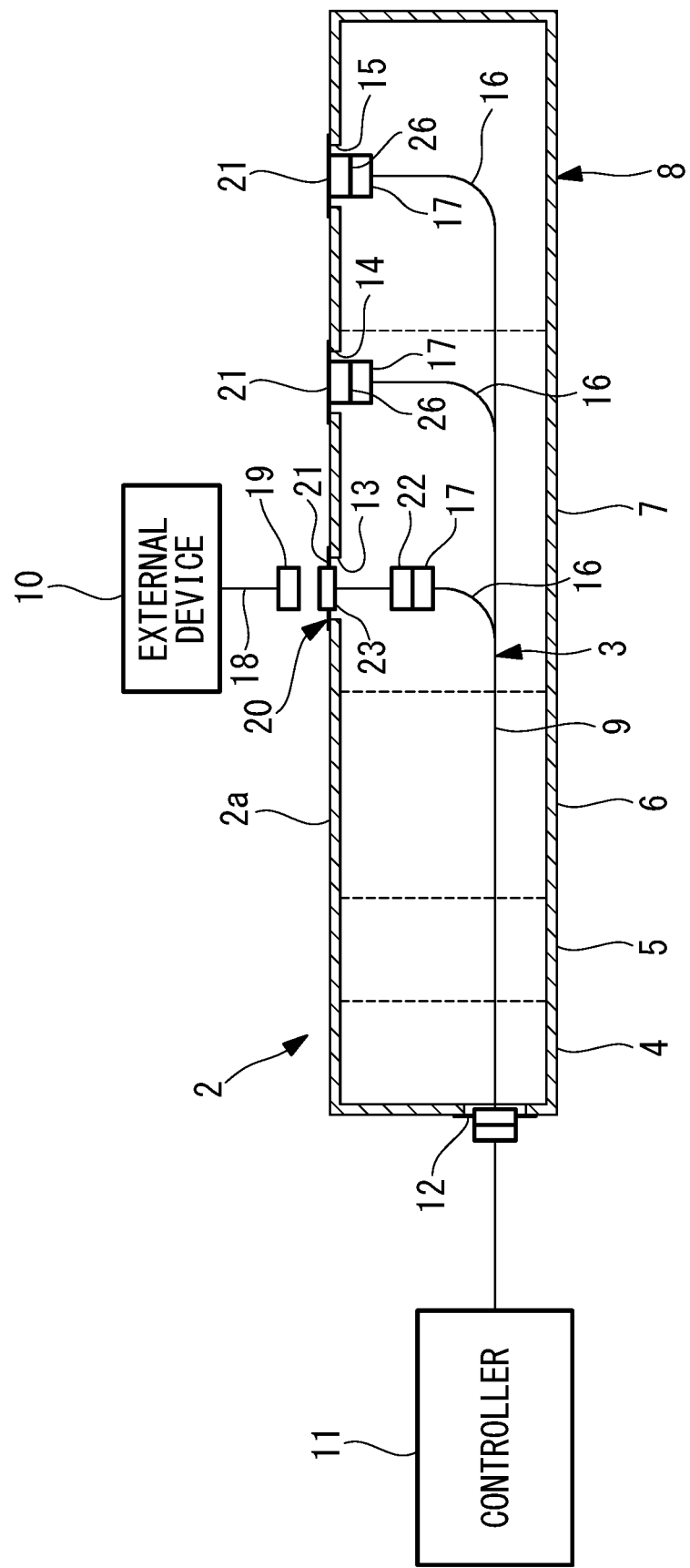
FIG. 8 is a schematic diagram showing a modification of the embodiment in FIG. 2, illustrating a case where the plates other than the line distribution board are provided with insulating caps.

In addition, as shown in FIG. 8, an insulating cap 26 for covering the connection surface of the internal connector 17 of a branch cable 16 may be attached to the surface, of the plate 21, disposed on the internal side of the robot main body 2. The insulating cap 26 is formed of an electrical insulating elastic material, such as rubber, and covers the connection surface of an internal connector 17 while being elastically deformed, thus being held in a state attached to the internal connector 17. When the openings 14 and 15 are closed with the plates 21, it is possible to prevent the terminals of unused internal connectors 17 from being exposed in the interior of the robot main body 2 by covering the connection surfaces of the unused internal connectors 17 with the insulating caps 26. In addition, in this case, the work of fixing the unused internal connector 17 shown in FIGS. 2 to 7 can be made unnecessary by optimizing the wire lengths of the corresponding branch cables 16.

In addition, although the openings 13, 14, and 15 are provided at the basal end portion of the second arm 7, an intermediate position of the second arm 7, and the wrist unit 8, respectively, in this embodiment, the locations of the openings 13, 14, and 15 are not limited. The openings 13, 14, and 15 may be provided in, for example, the swiveling body 5 or the first arm 6. In addition, the structure of the robot 1 is not limited to a vertical 6-axis articulated type. Instead of this, the present invention can be applied to any other type of robot.

Figure 9:
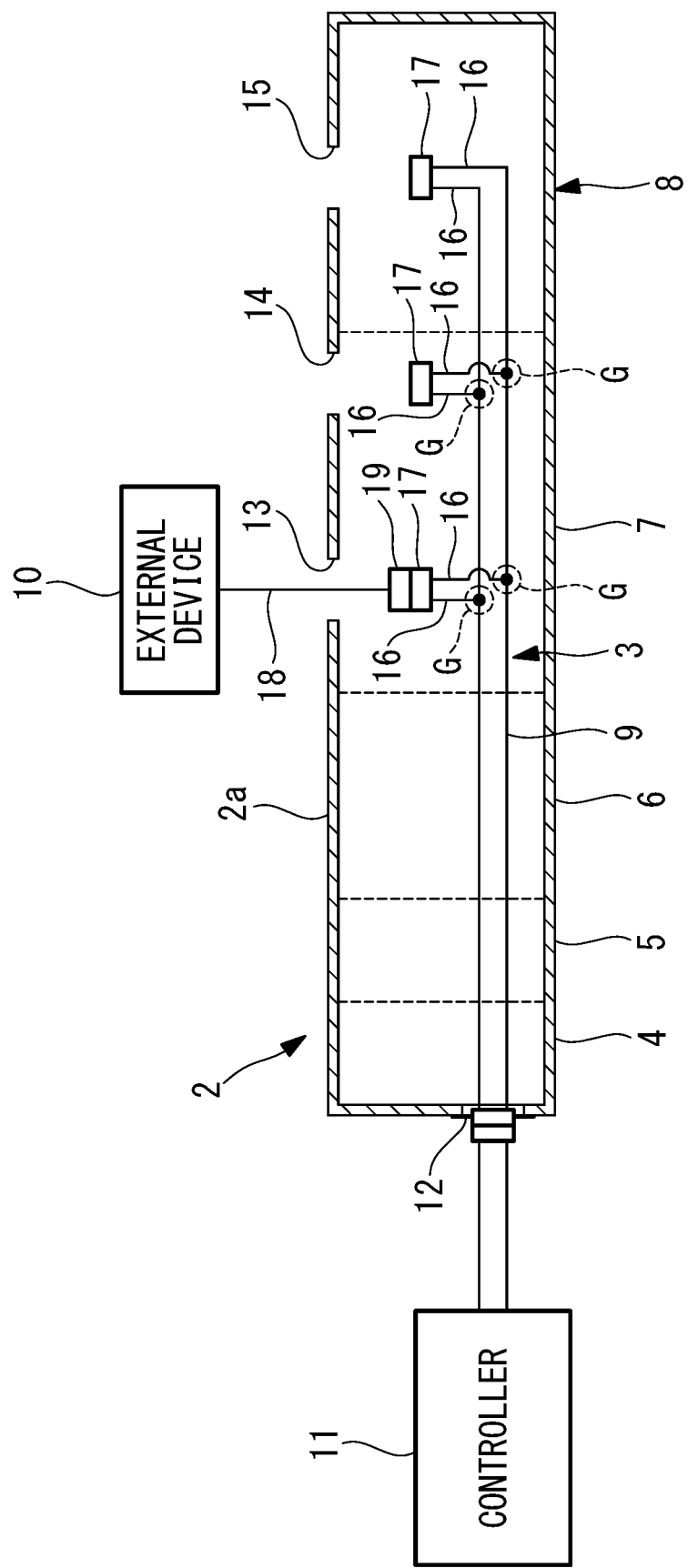
FIG. 9 is a schematic diagram showing a modification of the embodiment in FIG. 2, illustrating a case where there are two trunk cables.

In addition, this embodiment has been described by way of an example where the trunk cable 9 is a single continuous cable. Instead of this, however, the trunk cable 9 may be realized by a plurality of cables, as shown in FIG. 9. In addition, as shown in FIGS. 9 and 10, the trunk cables 9 and a branch cable 16 in the form of separate cables may be electrically connected to one another via electroconductive wire portions 27 and 28.

If the cable 3 includes, for example, two trunk cables 9 that are arranged in parallel and that are electrically continuous, as shown in FIG. 9, a branch cable 16 that is split off from one trunk cable 9 and another branch cable 16 that is split off from the other trunk cable 9 are connected to one internal connector 17.

Figure 10:
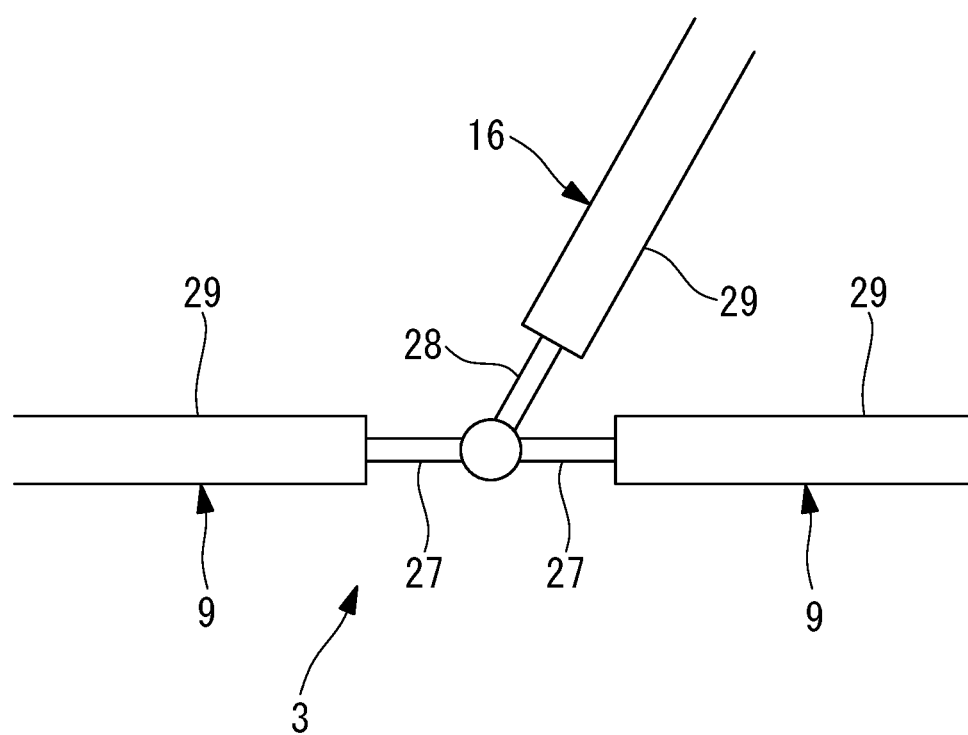
FIG. 10 is a magnified view of a G portion showing a contact point in FIG. 9.

Also, at a contact point G at which the trunk cables 9 and a branch cable 16 meet, i.e., the point at which the end section of the branch cable 16 is connected to the end sections of the trunk cables 9, the electroconductive wire portions 27 and 28 are exposed from respective insulators 29 covering the electroconductive wire portions 27 and 28, as shown in FIG. 10. Also, the exposed electroconductive wire portions 27 and 28 are connected by soldering or the like to achieve conduction between the wire portions 27 and 28.

The air tube contained in the end-effector cable 9 of the cable 3 also includes a branch tube that is split off via an air joint in the vicinity of each of the openings 13, 14, and 15 of the robot main body 2. By doing so, in the case where the attached external device 10 is a pneumatic device, air can also easily be supplied from any of the openings 13, 14, and 15. Note that in order to prevent air leaks, a cap is attached to the tip of each of the branch tubes of the air tube to which the external device 10 is not attached.

The invention claimed is:

1. A robot comprising:
   a robot main body having at least two openings passing through an outer wall thereof in a wall thickness direction;
   a cable routed in an interior of the robot main body, the cable includes branch cables, each of which is split off from a trunk cable of the cable in a vicinity of each of the openings, wherein each branch cable terminates at an internal connector; and
   a plurality of lid members that are detachably attached to the respective openings in the robot main body and that close the respective openings,
   wherein at least one of the plurality of lid members is a line distribution board,
   wherein the line distribution board comprises a relay connector having at least one internal attachment point which is opposite at least one external attachment point,
   wherein the at least one internal attachment point is connectable to one of the internal connectors, and the at least one external attachment point is connectable to an external connector of an external device fixed to an external surface of the robot main body.

2. The robot according to claim 1, wherein the at least two openings have a same shape.

3. The robot according to claim 1, wherein at least one of the plurality of lid members is an electrically insulating cap, wherein the electrically insulating cap comprises an insulated attachment point which is connectable to, thereby securing and terminating, one of the internal connectors.

4. The robot according to claim 1, wherein the at least one internal attachment point is a plurality of internal attachment points and the at least one external attachment point is a plurality of external attachment points.

5. The robot according to claim 1, wherein at least one of the plurality of lid members is a simple cover plate.

6. The robot according to claim 1, wherein each of the internal connectors is fixed to a corresponding one of the openings.

7. The robot according to claim 1, wherein the internal connectors include connection interfaces with the same external device or connection interfaces with the same relay connector.

8. The robot according to claim 1,
   wherein the trunk cable and each of the branch cables are separated from each other, and
   end sections of electroconductive wire portions of the branch cables are connected to an electroconductive wire portion of the trunk cable.

* * * * *